(12) United States Patent
Froeschner et al.

(10) Patent No.: US 7,708,249 B2
(45) Date of Patent: May 4, 2010

(54) ASSEMBLY OF EGGCRATE SUBSTRUCTURE FOR BOND JIGS

(75) Inventors: Neal A. Froeschner, Florissant, MO (US); Daniel R. Benjey, Alton, IL (US)

(73) Assignee: The Boeing Company, Chicago, IL (US)

( * ) Notice: Subject to any disclaimer, the term of this patent is extended or adjusted under 35 U.S.C. 154(b) by 106 days.

(21) Appl. No.: 11/181,182

(22) Filed: Jul. 13, 2005

(65) Prior Publication Data

US 2007/0051863 A1   Mar. 8, 2007

(51) Int. Cl.
*A47B 91/00* (2006.01)

(52) U.S. Cl. .............. 248/346.3; 248/346.01; 182/223; 312/108

(58) Field of Classification Search ........... 248/346.01, 248/346.3, 678; 16/221; 217/57; 312/108; 182/223, 222
See application file for complete search history.

(56) References Cited

U.S. PATENT DOCUMENTS

| | | | | | |
|---|---|---|---|---|---|
| 2,043 | A | * | 4/1841 | Wilkes | 164/90 |
| 385,085 | A | * | 6/1888 | Auth | 217/36 |
| 743,808 | A | * | 11/1903 | Beittenmiller | 217/47 |
| 844,039 | A | * | 2/1907 | Nowotny | 217/57 |
| 871,802 | A | * | 11/1907 | Johnson et al. | 217/57 |
| 1,088,488 | A | * | 2/1914 | Urdang | 190/21 |
| 1,317,026 | A | * | 9/1919 | Lavielle | 217/57 |
| 1,731,325 | A | * | 10/1929 | Stevens | 312/290 |
| 2,654,498 | A | * | 10/1953 | Jennison | 217/14 |
| 3,742,555 | A | * | 7/1973 | Hannes | 16/221 |
| 4,688,658 | A | * | 8/1987 | Stoner | 182/153 |
| 5,052,580 | A | * | 10/1991 | Khoury | 220/505 |
| 5,335,753 | A | * | 8/1994 | Campbell | 182/186.5 |
| 6,752,364 | B1 | * | 6/2004 | Lim | 248/188.6 |
| 7,076,323 | B2 | * | 7/2006 | Vanderwiel | 700/182 |
| 2006/0249642 | A1 | * | 11/2006 | Mavis et al. | 248/346.3 |

OTHER PUBLICATIONS

Campbell, "Manufacturing Processes for Advanced Composites", 2004, Elsevier Advanced Technology, pp. 110, 126.

* cited by examiner

*Primary Examiner*—J. Allen Shriver, II
*Assistant Examiner*—Bradley H Duckworth
(74) *Attorney, Agent, or Firm*—Yee & Associates, P.C.; Brett L. Halperin

(57) ABSTRACT

A system for supporting a bond jig comprises a plurality of planar panels including at least one mounting hole for fasteners in each panel, wherein a first panel is arranged in a non-orthogonal position to a second panel. The system further comprises a coupling element for coupling panels, comprising a first and second planar portion, a hinge element connecting the first and second planar portion, wherein the first planar portion and the second planar portion rotate around the hinge element to form an angle, and at least one mounting hole for fasteners in the first and second planar portion. The system further comprises at least one fastener for fastening the first planar portion to the first panel via a mounting hole in the first planar portion and a mounting hole in the first panel and at least one fastener for fastening the second planar portion to the second panel via the mounting hole in the second planar portion and the mounting hole in the second panel.

16 Claims, 4 Drawing Sheets

ASSEMBLY OF EGGCRATE SUBSTRUCTURE FOR BOND JIGS

GOVERNMENT RIGHTS

This invention was made with Government support under contract F33615-98-3-5104 awarded by the U.S. Air Force. The Government has certain rights in this invention.

BACKGROUND OF THE INVENTION

The present invention generally relates to composite bonding and curing tools, i.e., bond jigs, and, more particularly, to the assembly of egg-crate substructures for the assembly of bond jigs.

The fabrication of large vehicle components, such as wings for aircraft, often involves the manufacture of composite bonding and curing tools (bond jigs) that comprise a large mold for the component being fabricated. This mold, which is typically of an irregular, non-planar shape, may be supported by a lattice-like base such that the weight of the mold is distributed somewhat evenly about its bottom-facing surface, so as to avoid breaking or damage. The supporting base is referred to as an egg-crate substructure that supports the working surface (facing sheet) of bond jigs.

The egg-crate substructure often consists of a series of intersecting panels, or boards, that are bonded to the backside of the facing sheet. The boards are generally arranged in an egg-crate-like fashion such that the bottom, or floor side, of the egg-crate substructure is flat or planar for setting on a handling cart, or an oven or autoclave rack. A flat bottom of the egg-crate substructure allows for convenient assembly of the egg-crate substructure. The top, or bond jig-facing side, of the egg-crate substructure mirrors the irregular shape of the bond jig and therefore may comprise an undulating, concave, or convex shape such that the bond jig fits securely with the egg-crate substructure.

The attachment of the boards to one another can be accomplished by manually applying strips of fabric wetted with epoxy, referred to as wet-wrapping. This approach basically involves gluing the boards together at its junctures. The wet-wrapping method, however, is labor intensive and requires a lengthy curing period before further work can be performed on the substructure. Labor affects manufacturing costs and the curing period affects fabrication time. Further, the wet-wrapping method involves the use of volatile materials that can be untidy and require certain procedures for removal and disposal.

As can be seen, there is a need for an improved system and method for joining boards for an egg-create substructure for supporting bong jigs. Moreover, there is a need for a more efficient system and method for joining non-orthogonal boards for an egg-create substructure for supporting bong jigs.

SUMMARY OF THE INVENTION

In one aspect of the present invention, a system for supporting a bond jig comprises a plurality of planar panels including at least one orifice in each panel, wherein a first panel is arranged in a non-orthogonal position to a second panel. The system further comprises a coupling element for coupling panels, comprising a first planar portion, a second planar portion, a hinge element connecting the first planar portion with the second planar portion, wherein the first planar portion and the second planar portion rotate around the hinge element to form an angle, at least one orifice in the first planar portion, wherein the at least one orifice aligns with at least one orifice in the first panel, and at least one orifice in the second planar portion, wherein the at least one orifice aligns with at least one orifice in the second panel.

In another aspect of the present invention, a coupling element used for coupling panels that support a bond jig, wherein the panels are arranged in a non-orthogonal position, comprises a first planar portion and a second planar portion. The coupling element further comprises a hinge element connecting the first planar portion with the second planar portion, wherein the first planar portion and the second planar portion rotate around the hinge element to form an angle. The coupling element further comprises at least one orifice in the first planar portion, wherein the at least one orifice aligns with at least one orifice in a first panel, and at least one orifice in the second planar portion, wherein the at least one orifice aligns with at least one orifice in a second panel.

In still another aspect of the present invention, a system for supporting a bond jig comprises a plurality of planar panels including a plurality of orifices in each panel. The system further comprises a first coupling element used for coupling panels arranged in an orthogonal position, comprising a first planar portion, a second planar portion connected to the first planar portion at an orthogonal angle, a plurality of orifices in the first planar portion and the second planar portion and a plurality of fasteners for fastening the first planar portion to a first panel via at least one orifice in the first planar portion and at least one orifice in the first panel and for fastening the second planar portion to a second panel via at least one orifice in the second planar portion and at least one orifice in the second panel. The system further comprises a second coupling element used for coupling panels arranged in a non-orthogonal position, comprising a third planar portion, a fourth planar portion connected to the third planar portion via a hinge element, wherein the third planar portion and the fourth planar portion rotate around the hinge element to form an angle, a plurality of orifices in the third planar portion and the fourth planar portion and a plurality of fasteners for fastening the third planar portion to a third panel via at least one orifice in the third planar portion and at least one orifice in the third panel and for fastening the fourth planar portion to a fourth panel via at least one orifice in the fourth planar portion and at least one orifice in the fourth panel.

These and other features, aspects and advantages of the present invention will become better understood with reference to the following drawings, description and claims.

DETAILED DESCRIPTION OF THE INVENTION

Figure 1:
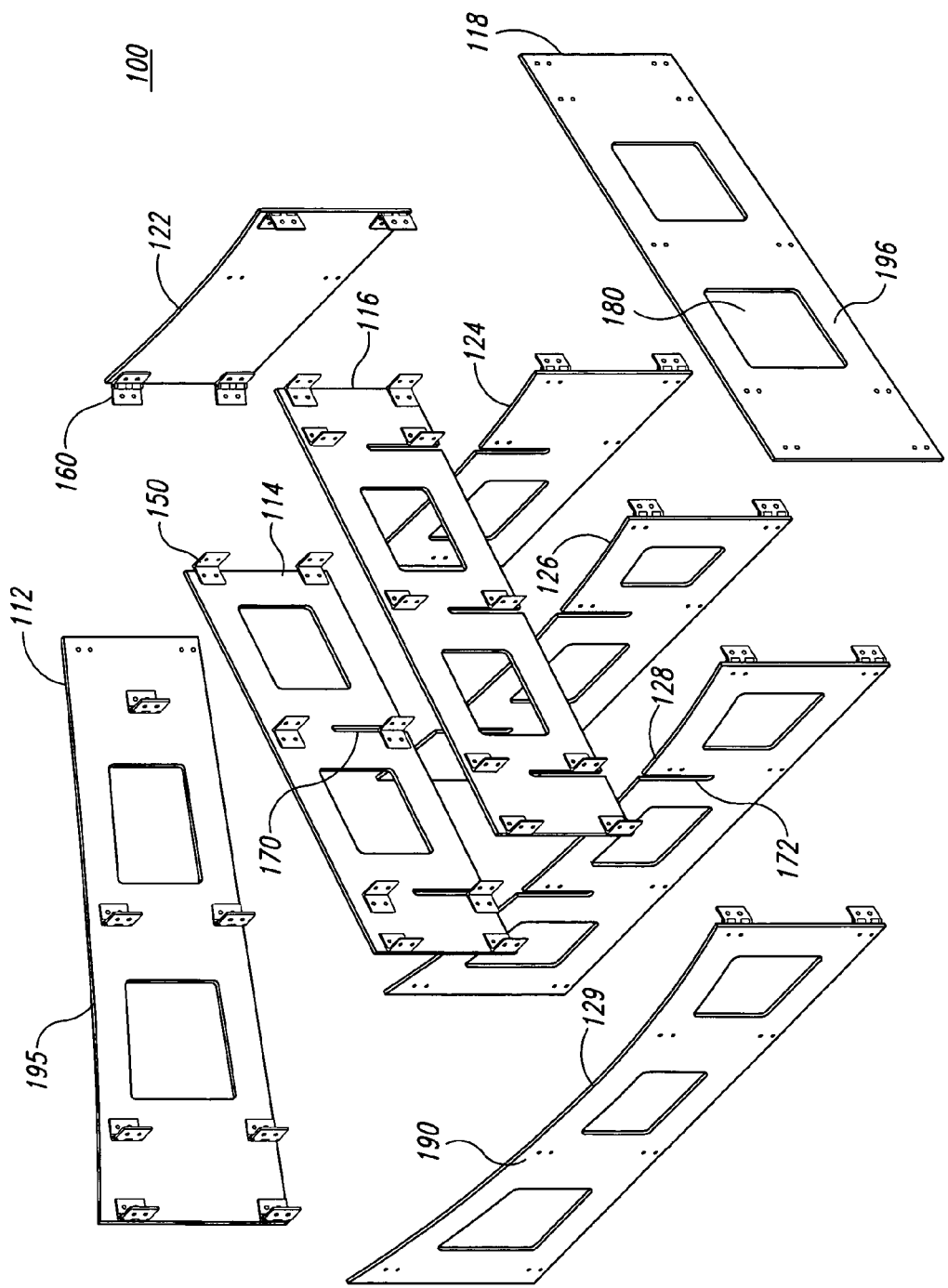
FIG. 1 is an exploded view of the pre-construction components of an egg-crate substructure for supporting bond jigs, according to an embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides a system for supporting a bond jig comprising a plurality of planar panels including a plurality of orifices, or mounting holes for fasteners, in each panel. The system according to one embodiment includes a hinged bracket coupling element used for coupling panels arranged in a non-orthogonal position. The hinged bracket includes a first and second planar portion connected via a hinge element, wherein the first planar portion and the second planar portion rotate around the hinge element to form an angle. A plurality of orifices, or mounting holes for fasteners, exists in the first and second portions. The hinged bracket further includes a plurality of fasteners for fastening the first and second portions to panels via orifices in the portions and orifices in the panels.

In one embodiment of the present invention, the system includes a ninety-degree bracket coupling element used for coupling panels arranged in an orthogonal, or ninety-degree, position. The ninety-degree bracket includes a first and second planar portion connected at an orthogonal angle. The ninety-degree bracket further includes a plurality of orifices, or mounting holes for fasteners, in the first and second portions and a plurality of fasteners for fastening the first and second portions to panels via orifices in the panels and orifices in the portions.

The present invention solves the problems of the prior art by providing a system that decreases the required amount of labor and eliminates the curing period associated with the conventional wet-wrapping method, wherein strips of fabric wetted with epoxy are manually applied to the junctures of panels, thereby gluing the boards together at its junctures. Using an embodiment of the present invention, further work can be performed on the substructure immediately upon construction of the egg-crate substructure, i.e., there is no waiting time due to a curing period, as in the wet-wrapping method. Thus, an embodiment of the present invention reduces manufacturing costs and fabrication time compared to the wet-wrapping method. Further, the system of the present invention eliminates the use of volatile materials, such as glue and epoxy as used in the wet-wrapping method, thereby simplifying the fabrication process.

The use of ninety-degree brackets at orthogonal (i.e., perpendicular or ninety-degree) junctures between boards is well-known in the art. For orthogonal junctures, the use of these brackets is quicker and easier than the wet-wrapping method, as it does not require a waiting period before continuing work. Often, however, due to the shape of the periphery of the facing sheet and/or the structural arrangement of the egg-crate substructure, the egg-crate boards do not intersect orthogonally, but rather at an acute or obtuse angle. The ninety-degree brackets can only be used at orthogonal intersections, and therefore acute and obtuse angles preclude the use of the brackets. Non-orthogonal angles in the substructure, or portions thereof, requires falling back to the less desirable wet-wrapping method. Therefore, the use of ninety degree brackets alone does not solve the problems of the prior art.

FIG. 1 is an exploded view of the pre-construction components of an egg-crate substructure 100 for supporting bond jigs, according to one embodiment of the present invention. The egg-crate substructure 100 may be used to support the manufacture of composite bonding and curing tools (bond jigs) that comprise a large mold for the component being fabricated, such as large vehicle components. This mold, which is typically of an irregular, non-planar shape, may be supported by the egg-crate substructure 100 such that the weight of the mold may be distributed somewhat evenly about its bottom-facing surface, which will contact the egg-crate substructure 100 at jig-facing side 195, so as to avoid breaking or damage.

The egg-crate substructure 100 consists of a series of intersecting panels, or boards, that may be bonded to the backside of the facing sheet of the mold. FIG. 1 shows substantially horizontal panels 112, 114, 116 and 118 and substantially vertical panels 122, 124, 126, 128 and 129. Note that the bottom, or floor side 196 of the panels 112, 114, 116 and 118 and panels 122, 124, 126, 128 and 129 may be flat or planar. A flat bottom 196 of the egg-crate substructure 100 allows for convenient assembly of the egg-crate substructure. The top, or bond jig-facing side 195 of the panels 112, 114, 116 and 118 and panels 122, 124, 126, 128 and 129 may be concave as it mirrors the irregular shape of the bond jig such that the bond jig fits securely within the egg-crate substructure 100. Note also the presence of cutouts in the panels, such as cutout 180 in panel 118, serves to lighten the weight of the egg-crate substructure 100, as well as increase airflow through the egg-crate substructure 100.

In one embodiment of the present invention, the panels 112, 114, 116 and 118 and panels 122, 124, 126, 128 and 129 may be composed of any one of wood, plastic, carbon fiber, epoxy resin or any combination of the above. The panels may further be composed of any material that allows for cutting and forming of the panels so as to allow the construction of an egg-crate substructure such as egg-crate substructure 100. Note also that although FIG. 1 shows nine panels 112, 114, 116, 118, 122, 124, 126, 128 and 129, the present invention supports any number of panels of any variety of shapes and sizes arranged in any arrangement so as to construct an egg-crate substructure such as egg-crate substructure 100.

The joining of the boards may be accomplished through the use of interposing alignment slots. Note slot 170 in panel 114 and slot 172 in panel 128. Panel 114 may be joined with panel 128 as slot 170 in panel 114 interconnects, or slides into, slot 172 in panel 128. The joining of the panels can further be accomplished through the use of ninety-degree brackets, such as ninety degree bracket 150, and pulled rivets 302, 304. FIG. 1 shows a ninety-degree bracket 150 connected to panel 114. The ninety-degree brackets, such as ninety degree bracket 150, which include bore holes 312, 314 for rivets or bolts 302, 304, may be placed at orthogonal junctures between panels, such as panels 114 and 124, and secured by inserting rivets or bolts 302, 304 through the bore holes 312, 314 and corresponding orifices 190 in the panels. Two panels, such as panel 114 and 124, joined using a ninety-degree bracket 150 must be arranged at a ninety-degree angle to each other As shown in FIG. 1, often the panels do not intersect orthogonally (perpendicular to each other), but rather at an acute or obtuse angle. The ninety-degree bracket 150 can only be used at orthogonal, or ninety-degree, intersections, and therefore these angles preclude the use of the ninety-degree bracket 150. Non-orthogonal angles in the egg-crate substructure 100 require the use of hinged brackets, such as hinged bracket 160 on panel 122. The hinged bracket 160, which includes bore holes 412, 414 for rivets or bolts 402, 404, may be placed at non-orthogonal junctures between panels, such as between panels 112 and 122, and secured by inserting rivets or bolts 402, 404 through the bore holes 412, 414 and corresponding orifices 190 in the panels 112, 122.

In one embodiment of the present invention, the first portion 452 and the second portion 454 (see FIG. 4) of the hinged bracket 160 may be capable of forming an angle as the portions rotate around the hinged element 450. In another embodiment of the present invention, the first portion 452 and the second portion 454 may be capable of forming substantially any acute angle greater than zero degrees and substantially any obtuse angle. In yet another embodiment of the present invention, the first portion 452 and the second portion 454 may be capable of forming substantially any angle from about zero degrees to about two hundred and seventy degrees.

The panels 112, 114, 116 and 118 and panels 122, 124, 126, 128 and 129 further show drilled holes that may be used for the securing of the ninety-degree brackets and the hinged brackets. See, for example, drilled holes or orifices 190 in panel 129. The hinged brackets, which include bore holes, may be secured to the panels by inserting rivets or bolts through the bore holes and corresponding orifices, such as drilled holes 190, in the panels. The drilled holes 190 in the panels automatically align with orifices in the brackets 150 and 160 when the panels are placed in position for construction, as shown in greater detail below with reference to FIG. 2.

Figure 2:
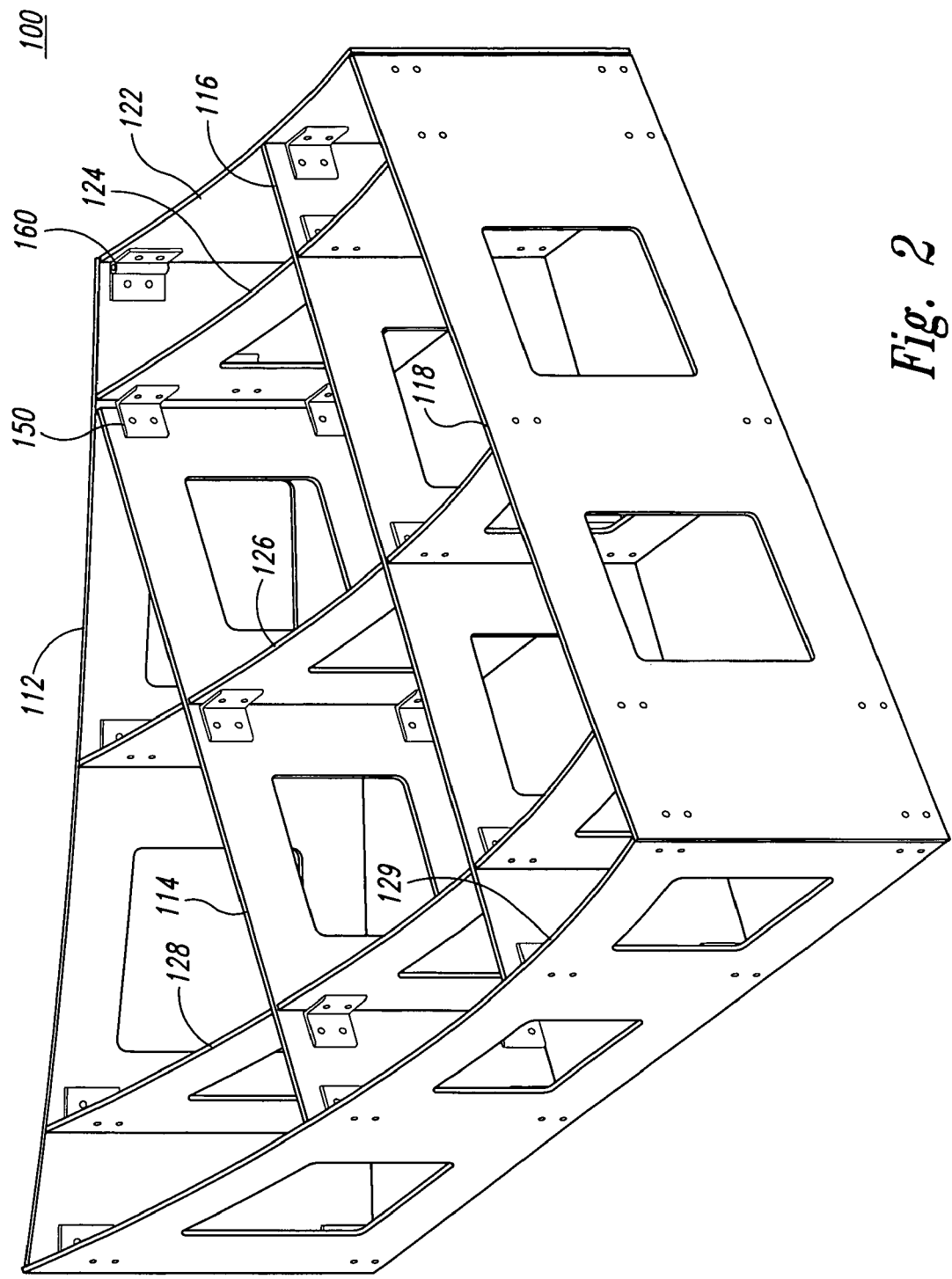
FIG. 2 is a perspective view of the constructed components of an egg-crate substructure for supporting bond jigs, according to one embodiment of the present invention.

FIG. 2 is a perspective view of the constructed components of an egg-crate substructure 100 for supporting bond jigs, according to one embodiment of the present invention. The egg-crate substructure 100 may be constructed using the ninety-degree brackets and the hinged brackets as described above. FIG. 2 shows that panel 112 has been coupled to panels 122, 124, 126, 128 and 129 using hinged brackets (such as hinged bracket 160), since panel 112 is arranged at a non-ninety-degree angle to panels 122, 124, 126, 128 and 129. Panel 114 has been coupled to panels 124, 126, 128 and 129 using ninety-degree brackets (such as ninety-degree bracket 150), since panel 114 is arranged at a ninety-degree angle to panels 124, 126, 128 and 129. Panel 116 has been coupled to panels 122, 124, 126, 128 and 129 using ninety-degree brackets, since panel 116 is arranged at a ninety-degree angle to panels 122, 124, 126, 128 and 129. Panel 118 has been coupled to panels 122, 124, 126, 128 and 129 using hinged brackets, since panel 118 is arranged at a non-ninety-degree angle to panels 122, 124, 126, 128 and 129.

Figure 3:
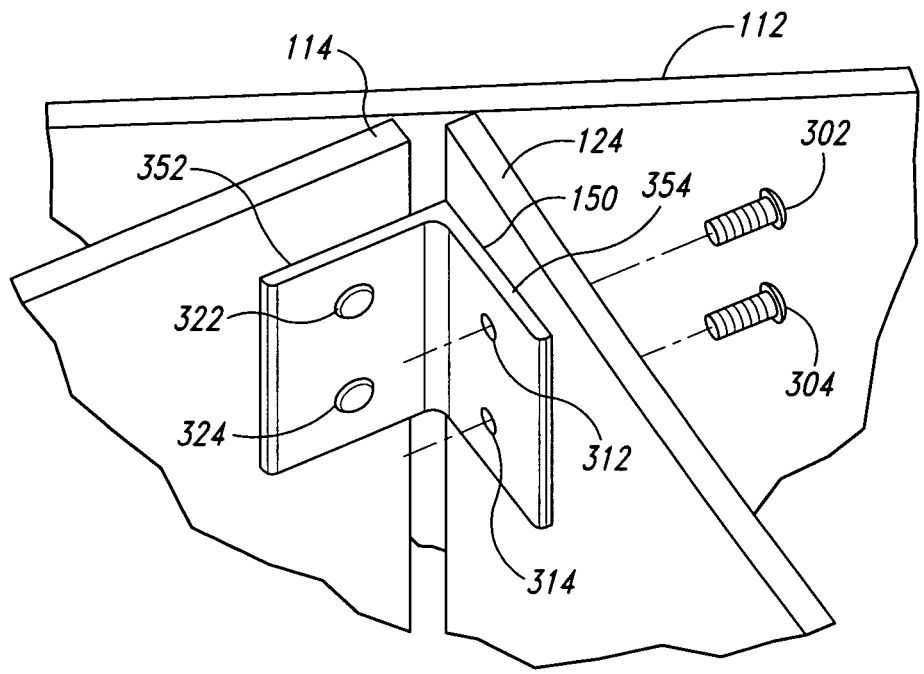
FIG. 3 is a perspective view of the ninety degree bracket component of an egg-crate substructure for supporting bond jigs, according to one embodiment of the present invention.

FIG. 3 is a perspective view of the ninety degree bracket component 150 of an egg-crate substructure 100 for supporting bond jigs, according to an embodiment of the present invention. FIG. 3 provides greater detail of the ninety degree bracket component 150 of FIG. 2. FIG. 3 shows the ninety degree bracket 150 comprising a first planar and rectangular portion attached to panel 114 of egg-crate substructure 100 and a second planar and rectangular portion attached to panel 124 of egg-crate substructure 100 (see FIG. 2). The first portion 352 of ninety degree bracket 150 may be attached to panel 114 via two orifices 322 and 324, in which rivets may be placed. These rivets enter through the two orifices 322 and 324 and through corresponding orifices in the panel 114, so as to secure the first portion 352 of ninety degree bracket 150 to panel 114.

The second portion 354 of ninety degree bracket 150 may be attached to panel 124 via two orifices 312 and 314, in which rivets 302 and 304, respectively, may be placed. The rivets 302 and 304 enter through the two orifices 312 and 314 and through corresponding orifices in the panel 124, so as to secure the second portion of ninety degree bracket 150 to panel 124. Panels 114 and 124 join at a vertex adjacent to panel 112. In one embodiment of the present invention, rivets 302 and 304 comprise rivets with a diameter of about $1/16$ inch to about $3/16$ inch.

In one embodiment, rivets 302 and 304 enter through orifices 190 in the panel 124 such that the heads of the rivets 302 and 304 meet the panel 124 and the points of the rivets 302 and 304 continue through the orifices 312 and 314 in the bracket 150. The points of the rivets may be expanded such that the rivets are secure and cannot fall out or pull out of the panel 124 and bracket 150. This arrangement allows for the elimination of the need for a washer at the point ends of the rivets 302 and 304. The bracket 150 may be composed of a solid material, such as steel or another metal, thereby supporting the expanded rivet points adjacent to the bracket 150.

Figure 4:
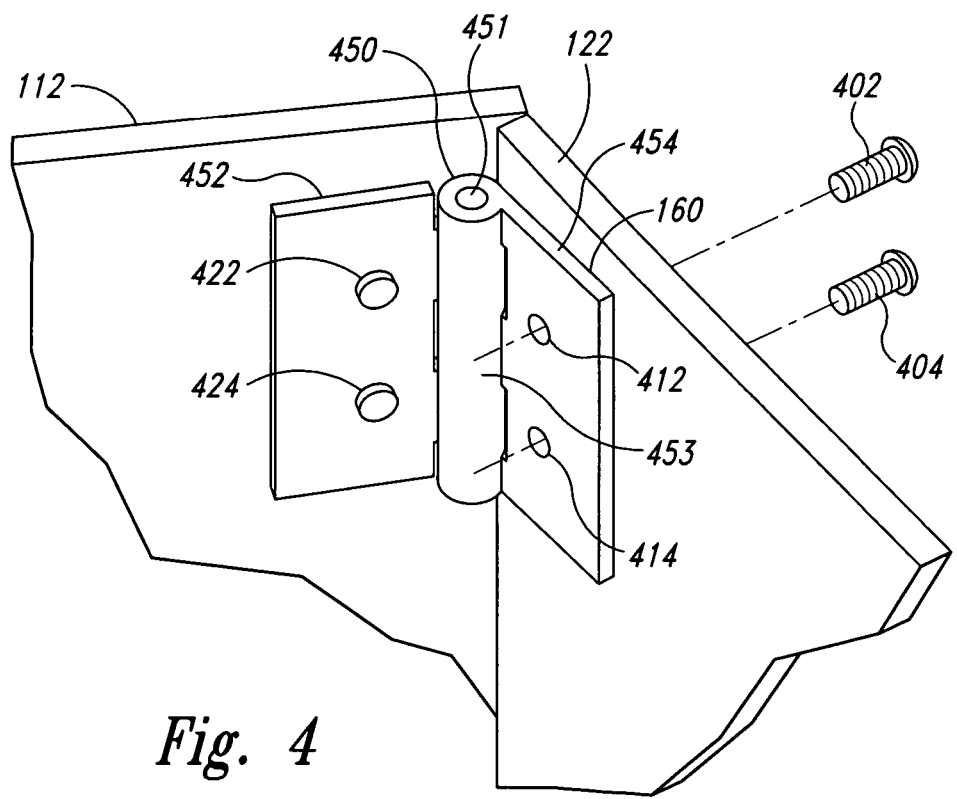
FIG. 4 is a perspective view of the hinged bracket component of an egg-crate substructure for supporting bond jigs, according to an embodiment of the present invention.

FIG. 4 is a perspective view of the hinged bracket component 160 of an egg-crate substructure 100 for supporting bond jigs, according to one embodiment of the present invention. FIG. 4 provides greater detail of the hinged bracket component 160 of FIG. 2. FIG. 4 shows the hinged bracket 160 comprising a first planar and rectangular portion 452 attached to panel 112 of egg-crate substructure 100 and a second planar and rectangular portion 454 attached to panel 122 of egg-crate substructure 100 (see FIG. 2).

The first portion 452 may be attached to the second portion 454 via a hinge element 450 that allows each portion to rotate about the hinge element 450. In one embodiment of the present invention, the hinge element 450 comprises a cylindrical part 453 integrally formed coupled with second portion 454 of the hinged bracket 160. The cylindrical part 453 of the hinge element 450 is coupled with first portion 452 of the hinged bracket 160. The cylindrical part 453 of the hinge element 450 includes a hollow portion 451, in which a hinge pin can be inserted so as to secure the first portion 452 of the hinged bracket 160 with the second portion 454 via the hinge element 450.

In one embodiment of the present invention, the first portion 452 and the second portion 454 of the hinged bracket 160 rotate around the hinged element 450 such that the first portion 452 and the second portion 454 form an angle. In another embodiment, the first portion 452 and the second portion 454 form substantially any acute angle greater than zero degrees and substantially any obtuse angle. In yet another embodiment of the present invention, the first portion 452 and the second portion 454 form substantially any angle from about zero degrees to about two hundred and seventy degrees.

The first portion 452 of hinged bracket 160 may be attached to panel 112 via two orifices 422 and 424, in which rivets may be placed. These rivets enter through the two orifices 422 and 424 and through corresponding orifices in the panel 112, so as to secure the first portion 452 of hinged bracket 160 to panel 112.

The second portion 454 of hinged bracket 160 may be attached to panel 122 via two orifices 412 and 414, in which rivets 402 and 404, respectively, may be placed. The rivets 402 and 404 enter through the two orifices 412 and 414 and through corresponding orifices in the panel 122, so as to secure the second portion 454 of hinged bracket 160 to panel 122. In one embodiment of the present invention, rivets 402 and 404 comprise rivets with a diameter of about $1/16$ inch to about $3/16$ inch.

In one embodiment, rivets 402 and 404 enter through orifices in the panel 122 such that the heads of the rivets 402 and 404 meet the panel 122 and the points of the rivets 402 and 404 continue through the orifices 412 and 414 in the bracket 160. The points of the rivets may be expanded such that the rivets are secure and cannot fall out or pull out of the panel 122 and bracket 160. This arrangement allows for the elimination of the need for a washer at the point ends of the rivets 402 and 404. The bracket 160 may be composed of a solid material, such as steel or another metal, thereby supporting the expanded rivet points adjacent to the bracket 160.

Figure 5:
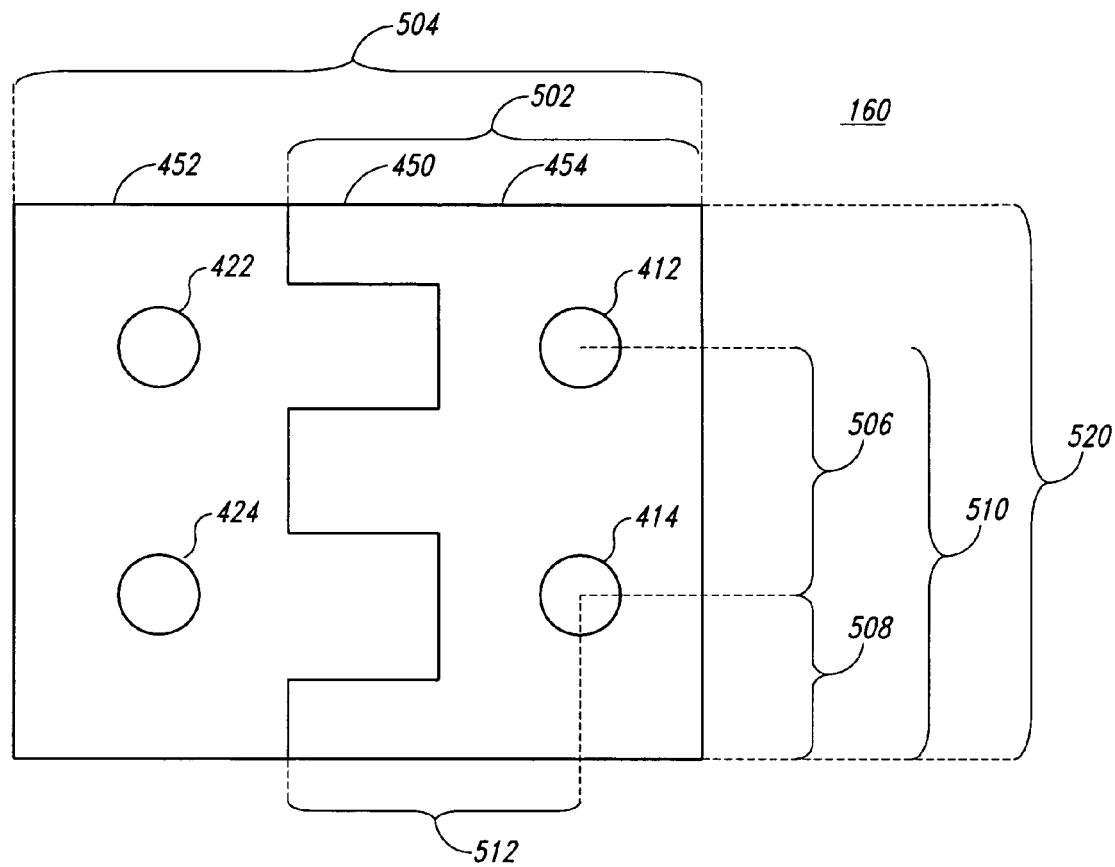
FIG. 5 is a frontal view of the hinged bracket component of an egg-crate substructure for supporting bond jigs, according to one embodiment of the present invention.

FIG. 5 is a frontal view of the hinged bracket component 160 of an egg-crate substructure 100 for supporting bond jigs, according to one embodiment of the present invention. FIG. 5 provides greater detail regarding the dimensions of the hinged bracket component 160 of FIG. 1.

FIG. 5 shows the hinged bracket 160 comprising a first portion 452 and a second portion 454 wherein the first portion 452 may be attached to the second portion 454 via a hinge element 450 that allows each portion to rotate about the hinge element 450. The first portion 452 of hinged bracket 160 includes two orifices 422 and 424, in which rivets may be placed. The second portion 454 of hinged bracket 160 also includes two orifices 412 and 414, in which rivets may be placed. Orifices 424 and 414 are located on the same height or vertical level. Likewise, orifices 422 and 412 are located on the same height or vertical level.

FIG. 5 shows a set of measurements that are described for exemplary purposes only. Orifices 422, 424, 412 and 414 have a diameter of about 0.1 inch to about 0.2 inch. The measurement 504 of the width of the hinged element 160 may be from about 2.5 inches in length to about 3.5 inches in length. The measurement 502 of the length of the hinged element 160 from one edge of the hinge 450 to the outer edge of the hinged element may be from about 1.5 inches in length to about 2.5 inches in length. The measurement 512 of the length of the hinged element 160 from one edge of the hinge 450 to the center of orifice 414 of the hinged element may be from about 0.8 inch in length to about 1.1 inches in length.

The measurement 520 of the height of the hinged element 160 may be from about 2.5 inches in length to about 3.5 inches in length. The measurement 510 of the length of the hinged element 160 from the center of the orifice 412 to an outer edge of the hinged element may be from about 1.75 inches in length to about 2.5 inches in length. The measurement 506 of the length of the hinged element 160 from the center of orifice 412 to the center of orifice 414 may be from about 1.0 inch in length to about 2.0 inches in length. The measurement 508 of the length of the hinged element 160 from the center of the orifice 414 to an outer edge of the hinged element may be from about 0.75 inch in length to about 1.5 inches in length.

Figure 6:
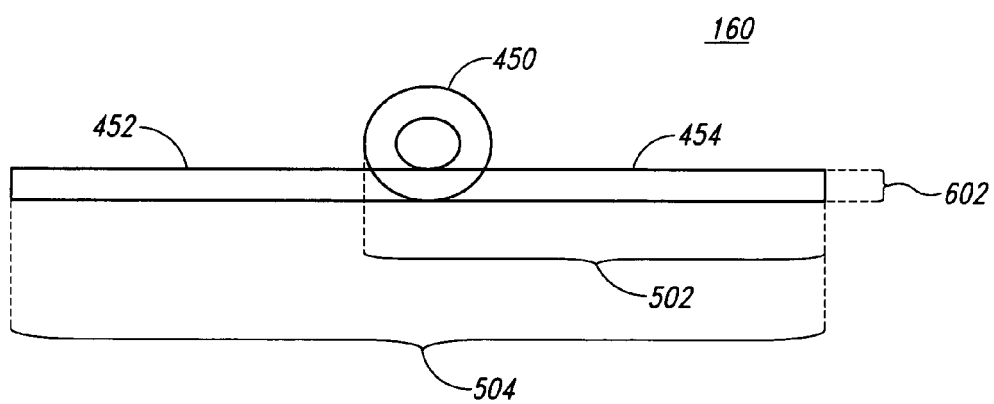
FIG. 6 is a bottom view of the hinged bracket component of an egg-crate substructure for supporting bond jigs, according to one embodiment of the present invention.

FIG. 6 is a bottom view of the hinged bracket component 160 of an egg-crate substructure 100 for supporting bond jigs, according to one embodiment of the present invention. FIG. 6 provides greater detail regarding the dimensions of the hinged bracket component 160 of FIG. 1. FIG. 6 shows the hinged bracket 160 comprising a first portion 452 and a second portion 454 wherein the first portion 452 may be attached to the second portion 454 via a hinge element 450 that allows each portion to rotate about the hinge element 450.

FIG. 6 shows a set of measurements that are described for exemplary purposes only. The measurement 504 of the width of the hinged element 160 may be from about 2.5 inches in length to about 3.5 inches in length. The measurement 502 of the length of the hinged element 160 from one edge of the hinge 450 to the outer edge of the hinged element may be from about 1.5 inches in length to about 2.5 inches in length. The measurement 602 of the depth of the first portion 452 and second portion 454 of the hinged element may be from about 0.12 inch in length to about 0.25 inch in length. The diameter of the orifice of the hinge element 450 has a diameter of no less than 0.2 inch.

It should be understood, of course, that the foregoing relates to exemplary embodiments of the invention and that modifications may be made without departing from the spirit and scope of the invention as set forth in the following claims.

We claim:

1. A system for supporting a bond jig, the system comprising:
    an egg-crate substructure, comprising:
        a substantially flat bottom side;
        a top side; and
        a plurality of intersecting panels between the bottom side and the top side forming a plurality of compartments, panels of the plurality of intersecting panels including at least one orifice extending therethrough, a first panel of the plurality of intersecting panels being arranged at a non-orthogonal angle with respect to a second panel of the plurality of intersecting panels, and edges of the plurality of intersecting panels forming the top side having an irregular shape for supporting the bond jig; and
    a coupling element for securing the first panel to the second panel at the non-orthogonal angle, the coupling element comprising:
        a first planar portion fastened to the first panel;
        a second planar portion fastened to the second panel; and
        a hinge element connecting the first planar portion to the second planar portion, the first planar portion and the second planar portion configured to rotate around the hinge element to arrange the first panel at the non-orthogonal angle with respect to the second panel.

2. The system of claim 1, further comprising:
    at least one first fastener for fastening the first planar portion to the first panel; and
    at least one second fastener for fastening the second planar portion to the second panel.

3. The system of claim 2, wherein the at least one first fastener comprises two first fasteners, and wherein the at least one second fastener comprises two second fasteners.

4. The system of claim 2, wherein each at least one first fastener and each at least one second fastener comprises any one of:
    a rivet;
    a bolt and nut;
    a nail;
    a screw; and
    any combination of the above.

5. The system of claim 1, wherein the irregular shape comprises a curved shape to contour to a curved shape of the bond jig.

6. The system of claim 1, and further comprising interposed alignment slots in the first and second panels for joining the first and second panels.

7. The system of claim 1, wherein the coupling element comprises a first coupling element having a first hinge element, and the non-orthogonal angle comprises a first non-orthogonal angle, and further comprising:
    a second coupling element for securing a third panel of the plurality of intersecting panels to a fourth panel of the plurality of intersecting panels at a second non-orthogonal angle with respect to each other, wherein the second coupling element includes a second hinge element for positioning the third and fourth panels at the second non-orthogonal angle with respect to each other.

8. A bond jig support system having a substantially flat bottom side and a top side, the bond jig support system comprising:
- a plurality of intersecting panels arranged between the bottom side and the top side to form an egg-crate substructure having a plurality of compartments, panels of the plurality of intersecting panels including at least one orifice extending therethrough, and edges of the plurality of intersecting panels forming the top side having an irregular shape for supporting the bond jig;
- a first coupling element for securing a first panel and a second panel of the plurality of intersecting panels at an orthogonal angle with respect to each other, the first coupling element comprising:
  - a first planar portion fastened to the first panel; and
  - a second planar portion fastened to second panel and connected to the first planar portion at the orthogonal angle; and
- a second coupling element for securing a third panel and a fourth panel of the plurality of intersecting panels at a non-orthogonal angle with respect to each other, the second coupling element comprising:
  - a third planar portion fastened to the third panel; and
  - a fourth planar portion fastened to the fourth panel and connected to the third planar portion via a hinge element, the third planar portion and the fourth planar portion configured to rotate around the hinge element to form the non-orthogonal angle.

9. The system of claim 8, and further comprising at least one fastener for fastening each of the first, second, third and fourth planar portions to the first, second, third and fourth panels, respectively.

10. The system of claim 9, wherein the at least one fastener comprises two fasteners.

11. The system of claim 8, and further comprising interposed alignment slots in the first, second, third and fourth panels for joining the first and second panels and for joining the third and fourth panels.

12. A support substructure having a flat bottom side and a top side, the support sub structure comprising:
- a plurality of intersecting panels arranged between the bottom side and the top side to form an egg-crate structure having a plurality of compartments, panels of the plurality of intersecting panels having a substantially flat first edge coincident with the bottom side, and a second edge opposite the first edge and coincident with the top side, the second edges of the panels of the plurality of intersecting panels having an irregular shape, and the panels of the plurality of intersecting panels further having at least one orifice extending therethrough; and
- a coupling element for securing a first panel of the plurality of intersecting panels to a second panel of the plurality of intersecting panels at a non-orthogonal angle with respect to each other, the coupling element including a hinge element connected to the first and second panels for positioning the first and second panels at the non-orthogonal angle with respect to each other.

13. The support substructure of claim 12, wherein the irregular shape contours to a bottom surface of an object to be supported by the substructure.

14. The support substructure of claim 13, wherein the object comprises a bond jig.

15. The support substructure of claim 12, wherein the at least one orifice a comprises at least one cutout for reducing weight of the support substructure.

16. The support substructure of claim 12, wherein at least two panels of the plurality of intersecting panels include interposing alignment slots for joining the at least two panels.

* * * * *